(12) United States Patent
Chenoweth et al.

(10) Patent No.: US 11,008,915 B2
(45) Date of Patent: May 18, 2021

(54) DIESEL EXHAUST FLUID TANK FREEZE MITIGATION

(71) Applicant: Caterpillar Inc., Deerfield, IL (US)

(72) Inventors: Kurtis Chenoweth, Ipava, IL (US);
Jason Hudgens, Washington, IL (US);
Xiaohui Gong, Dunlap, IL (US);
Shivsinh Parmar, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 162 days.

(21) Appl. No.: 16/359,882

(22) Filed: Mar. 20, 2019

(65) Prior Publication Data

US 2020/0300143 A1  Sep. 24, 2020

(51) Int. Cl.
*F01N 3/20* (2006.01)
*F01N 3/28* (2006.01)

(52) U.S. Cl.
CPC ......... *F01N 3/2066* (2013.01); *F01N 3/2896* (2013.01)

(58) Field of Classification Search
CPC ......... F01N 2610/02; F01N 2610/1413; F01N 2610/1406; F01N 2610/1433; F01N 2610/1493
See application file for complete search history.

(56) References Cited

U.S. PATENT DOCUMENTS

| 9,273,581 | B2 | 3/2016 | Van Vuuren |
| 9,580,296 | B2* | 2/2017 | Daniels .................... B67D 7/02 |
| 9,638,085 | B2 | 5/2017 | Hertsgaard et al. |
| 9,689,292 | B2* | 6/2017 | Hu .......................... F01N 3/208 |
| 10,054,021 | B2 | 4/2018 | Hudgens |
| 2009/0199538 | A1* | 8/2009 | Boe .......................... F01N 3/208 60/274 |
| 2014/0283505 | A1* | 9/2014 | Schepers ................ F01N 3/2066 60/303 |
| 2015/0283505 | A1* | 10/2015 | Brooks .............. B01D 53/9409 252/182.34 |

FOREIGN PATENT DOCUMENTS

CN 203239429 U 10/2013
WO WO 2013/055363 A1 4/2013

* cited by examiner

*Primary Examiner* — Anthony Ayala Delgado
(74) *Attorney, Agent, or Firm* — Hibshman Claim Construction PLLC

(57) ABSTRACT

A diesel exhaust fluid (DEF) system and a method of controlling the DEF system are disclosed. The method may include determining that a shutdown condition of the DEF system is satisfied; providing a control signal to open a valve of a buffer tank of the DEF system based on determining that the shutdown condition of the DEF system is satisfied; determining that a level of DEF remaining in the buffer tank satisfies a threshold; and closing the valve of the buffer tank based on the level of DEF remaining in the buffer tank satisfying the threshold.

15 Claims, 5 Drawing Sheets

DIESEL EXHAUST FLUID TANK FREEZE MITIGATION

TECHNICAL FIELD

The present disclosure relates generally to exhaust treatment systems for internal combustion engines and, more particularly, to diesel exhaust fluid (DEF) freeze mitigation for a buffer tank of a DEF system.

BACKGROUND

Exhaust treatment systems may be used to reduce or remove components of the exhaust of internal combustion engines. Exhaust emission standards for internal combustion engines have become increasingly rigorous, and manufacturers have developed exhaust treatment systems to reduce the amount of certain components in the exhaust. For example, the amount of nitrogen oxides ($NO_x$) emitted from an engine may be limited by environmental regulations. Some exhaust treatment systems for diesel engines may discharge diesel exhaust fluid (DEF) into the exhaust flow to reduce the amount of $NO_x$ in the exhaust. DEF is a solution of urea and water that is discharged into a mixing zone of an engine exhaust pipe upstream of a catalyst of a selective catalytic reduction (SCR) system. The exhaust with the $NO_x$ heats the DEF and causes the DEF to break down into ammonia ($NH_3$) and carbon dioxide ($CO_2$). As the $NO_x$ and ammonia pass over the catalyst, the $NO_x$ and ammonia react to produce nitrogen ($N_2$) and water.

Diesel engine exhaust treatment systems often include a large reservoir for storing the DEF (referred to herein as a bulk tank) and a pump for withdrawing the DEF from the bulk tank. The pump advances the DEF to a nozzle, which discharges the DEF into the mixing zone of the exhaust pipe. Some DEF systems use a bulk tank and another tank, referred to herein as a buffer tank, so that the DEF can be stored in closer proximity to the nozzle and so that freezing of the DEF can be mitigated.

One attempt to provide a buffer tank for DEF freeze mitigation is disclosed in U.S. Pat. No. 10,054,021 that issued to Caterpillar on Aug. 21, 2018 ("the '021 patent"). In particular, the '021 patent discloses an exhaust treatment system. The exhaust treatment system includes a bulk tank for storing DEF, a transfer pump, an accumulator, and a dosing pump. The accumulator may include a drain opening that allows for DEF in the accumulator to return to the bulk tank. The drain opening may be a gravity drain that relies on the force of gravity to draw the DEF through the drain opening. Upon shutdown of the machine or stopping of the transfer pump, any DEF within the accumulator passively drains back to the bulk tank via the drain opening and the drain line to empty the inlet portion. In one form, the drain opening can be selectively opened and closed such as via a solenoid valve. For example, the drain opening may remain closed during operation of the machine and then the solenoid valve could open the drain opening upon shutdown of the machine to drain the DEF from the inlet portion.

While the exhaust treatment system of the '021 patent may disclose an accumulator that includes a drain opening that allows for DEF in the accumulator to return to the bulk tank and that can be selectively opened and closed such as via a solenoid valve, improvement of the exhaust treatment system may provide further increased protection against DEF freezing in the accumulator or decreased thaw time for the DEF system.

The DEF system of the present disclosure solves one or more of the problems set forth above and/or other problems in the art.

SUMMARY

A method may include determining that a shutdown condition of a diesel exhaust fluid (DEF) system is satisfied; providing a control signal to open a valve of a buffer tank of the DEF system based on determining that the shutdown condition of the DEF system is satisfied; determining that a level of DEF remaining in the buffer tank satisfies a threshold; and/or closing the valve of the buffer tank based on the level of DEF remaining in the buffer tank satisfying the threshold.

A DEF system may include a buffer tank; a bulk tank; a solenoid valve to allow DEF to drain from the buffer tank to the bulk tank; a level sensor to indicate a level of DEF remaining in the buffer tank; and an electronic control module (ECM) to: close the solenoid valve during operation of the DEF system, provide a control signal to open the solenoid valve when a shutdown condition of the DEF system is satisfied, and close the solenoid valve, after opening the solenoid valve, when the level of DEF remaining in the buffer tank satisfies a threshold.

A DEF system may include a buffer tank; a bulk tank; a normally open solenoid valve to allow DEF to drain from the buffer tank to the bulk tank, wherein the normally open solenoid valve is configured to be closed during operation of the DEF system, and wherein the normally open solenoid valve is configured to be open when a shutdown condition of the DEF system is satisfied or when the DEF system is unpowered; and an ECM to provide a control signal to close the normally open solenoid valve during operation of the DEF system.

DETAILED DESCRIPTION

This disclosure relates to a DEF system. The DEF system has universal applicability to any machine utilizing such a DEF system, such as a machine utilizing a diesel engine. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, a locomotive, or other above ground equipment, underground equipment, or marine equipment.

Figure 1:
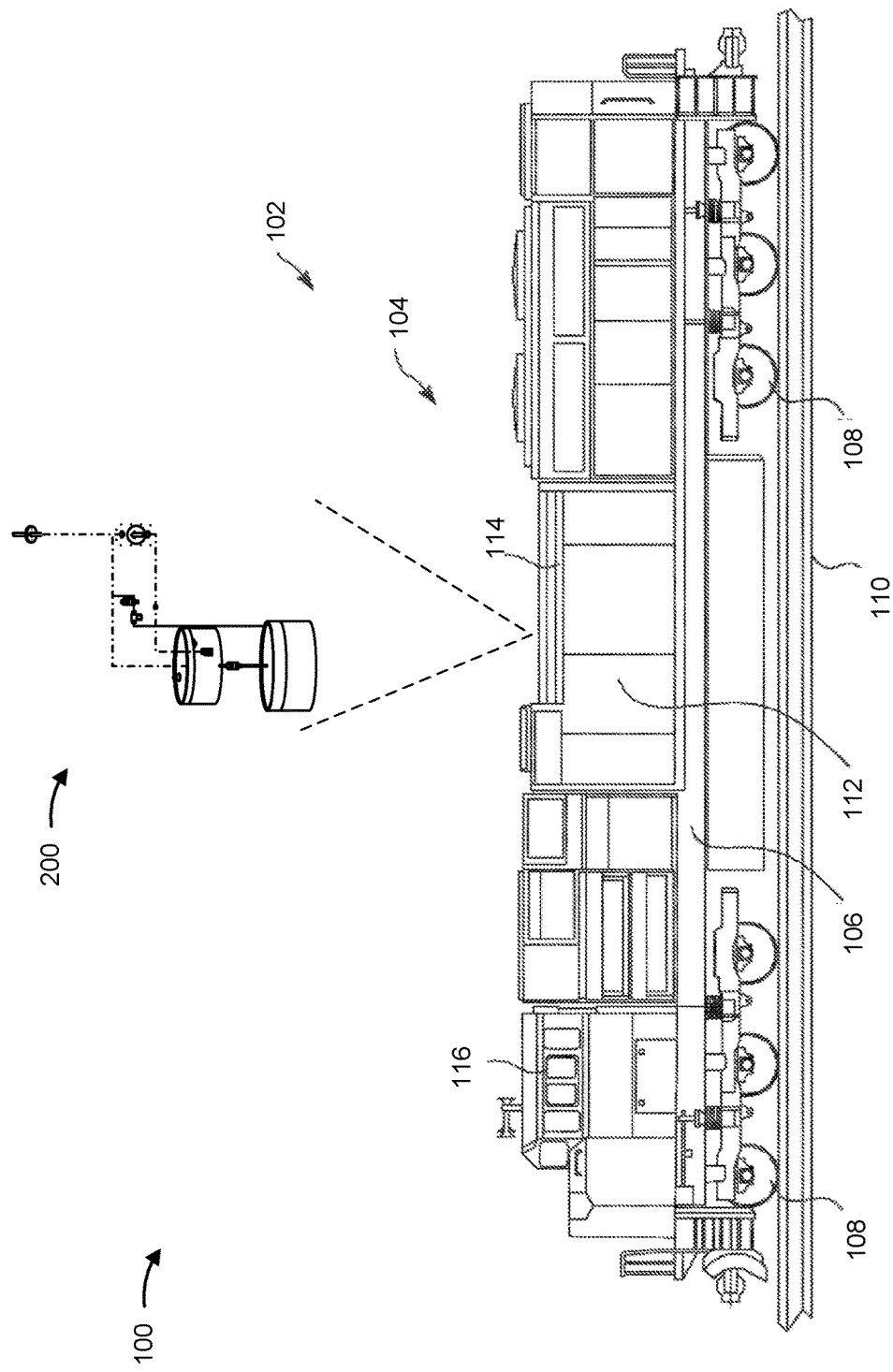
FIG. 1 is a diagram of an example machine that includes a diesel exhaust fluid (DEF) system described herein.

FIG. 1 is a diagram 100 of an example machine that includes an aftertreatment module described herein. Diagram 100 shows an example machine 102. More specifically, the machine 102 is a locomotive 104. The machine 102 may be any other machine described herein.

The locomotive 104 may include a frame 106. The frame 106 may support one or more components of the locomotive 104. The locomotive 104 may include a set of wheels 108 mounted to the frame 106. The wheels 108 may support and provide mobility to the locomotive 104 on a set of rails 110. The locomotive 104 may include an enclosure 112 mounted on the frame 106. The enclosure 112 may house one or more components (not shown) provided on the frame 106 of the locomotive 104.

The locomotive 104 may include an engine (not shown) provided on the frame 106 and within the enclosure 112. The engine may be an internal combustion engine or a gas turbine. The engine may be powered by a fuel such as diesel, gasoline, natural gas, and/or the like. The engine may generate mechanical power for the locomotive 104.

The locomotive 104 may include a generator, or a traction alternator, provided on the frame 106 and within the enclosure 112. The generator may be mechanically coupled to the engine. The generator may receive the mechanical power from the engine and may generate electrical power for the locomotive 104.

The locomotive 104 may also include an electric motor, also known as a traction motor, provided on the frame 106 and within the enclosure 112. The electric motor may be electrically coupled to the generator. The electric motor may be further coupled to the wheels 108. The electric motor may receive the electrical power from the generator and may provide motive power to the wheels 108 of the locomotive 104. The locomotive 104 may include a transmission system (not shown) coupled between the electric motor and the wheels 108. The transmission system may include various components such as gears, bearings, shafts, axles, and/or the like. The transmission system may transfer the motive power from the electric motor to the wheels 108.

The locomotive 104 may include various components and/or systems (not shown) provided on the frame 106 and/or within the enclosure 112, such as a fuel delivery system, an air supply system, a cooling system, a lubrication system, an electrical/electronic control system, a rectifier, an inverter, batteries, a safety system, a drive control system, a brake control system, a turbocharger, an exhaust gas recirculation system, a regenerative braking system, peripheries, and/or the like based on a use and/or function of the locomotive 104.

The locomotive 104 may include an exhaust gas aftertreatment system 114 provided on the frame 106 of the machine 102. The exhaust gas aftertreatment system 114 may be coupled to the engine. The exhaust gas aftertreatment system 114 may receive exhaust gases generated by the engine. The exhaust gas aftertreatment system 114 may treat the exhaust gases before releasing the exhaust gases into the atmosphere. The exhaust gas aftertreatment system 114 may include a number of components (not shown) such as a Diesel Oxidation Catalyst (DOC), a Diesel Particulate Filter (DPF), a reductant injection system, a mixer, a Selective Catalytic Reduction (SCR) unit, and/or the like based on a design of the exhaust gas aftertreatment system 114. Specifically, the exhaust gas aftertreatment system 114 may include a DEF system 200 that may inject DEF into the exhaust flow generated by the engine.

The locomotive 104 may include an operator cabin 116 provided on the frame 106. The operator cabin 116 may house various controls of the locomotive 104 including levers, pedals, joysticks, buttons, a control interface, audio video devices, a communication system, an operator seat, and/or the like. The controls may be configured to operate and/or control the locomotive 104.

As indicated above, FIG. 1 is provided as an example. Other examples may differ from what is described in connection with FIG. 1.

Figure 2:
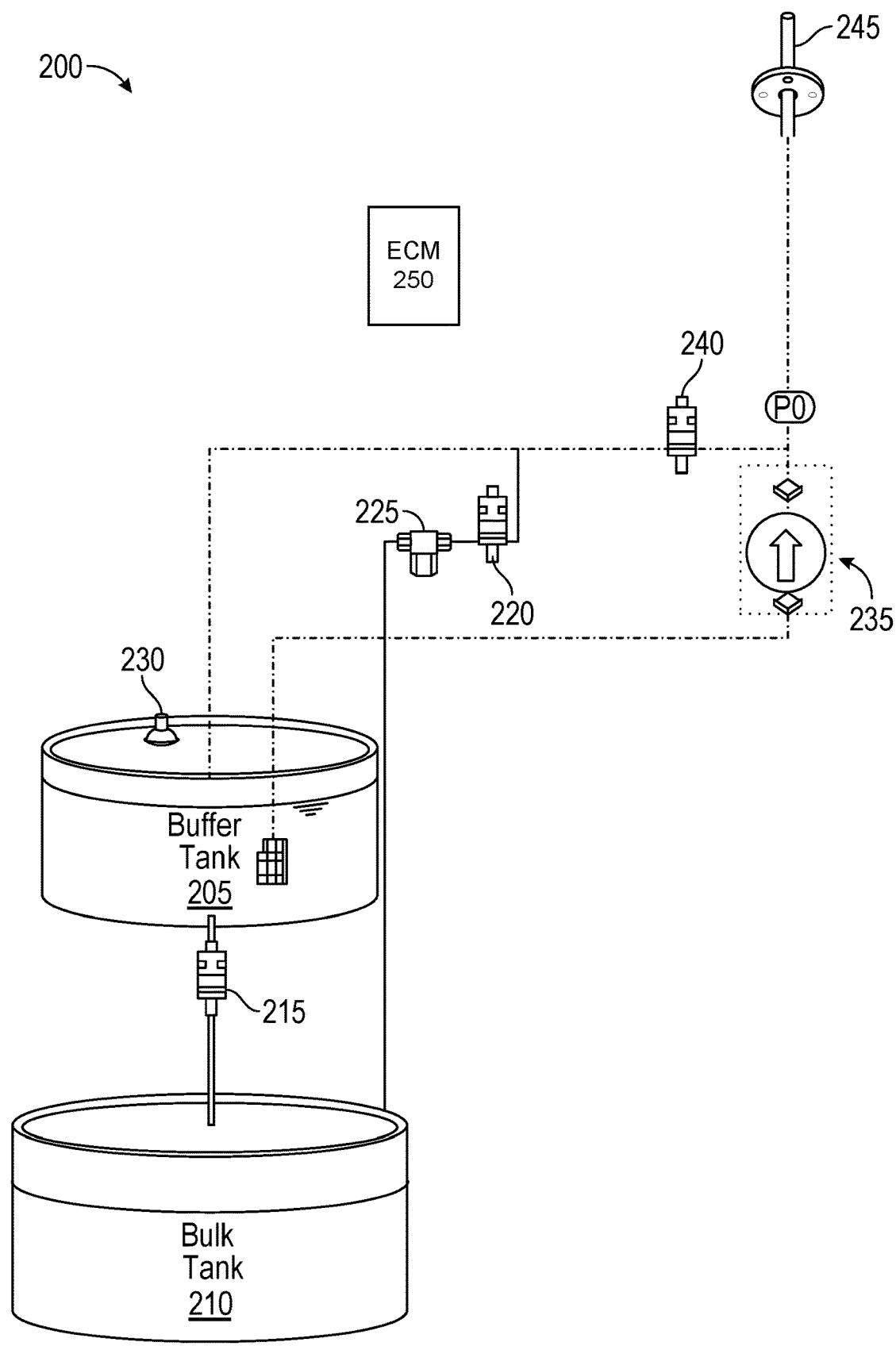
FIG. 2 is diagram of an example DEF system that may be used with the machine of FIG. 1.

FIG. 2 is a diagram of an example DEF system 200 described herein. As shown, DEF system 200 includes a buffer tank 205 and a bulk tank 210.

Buffer tank 205 may hold DEF to be injected into an exhaust flow by DEF system 200. For example, buffer tank 205 may receive DEF from bulk tank 210 and may store the DEF until the DEF is injected into the exhaust flow or returned to bulk tank 210. In some implementations, buffer tank 205 may include a heater (not shown in FIG. 2) to apply heat to the DEF in order to thaw the DEF after a period of inactivity or in sub-freezing operating temperatures. In some implementations, buffer tank 205 may be smaller than bulk tank 210. In some implementations, buffer tank 205 may be referred to as an accumulator.

Bulk tank 210 may store DEF to be used by DEF system 200. Bulk tank 210 may be connected to buffer tank 205 so that bulk tank 210 can receive DEF from buffer tank 205 (e.g., via tank drain solenoid 215) or provide DEF to buffer tank 205 (e.g., via tank fill solenoid 220). In some implementations, the DEF provided to buffer tank 205 may be filtered by a filter 225, which may include a 40 micron filter or another type of filter.

Tank drain solenoid 215 may be a solenoid valve, such as a normally open solenoid valve or a normally closed solenoid valve. As used herein, a normally open solenoid valve may refer to a valve that is open in a default or unpowered state and that closes based on a control signal. As used herein, a normally closed solenoid valve may refer to a valve that is closed in a default or unpowered state and that opens based on a control signal.

As shown, buffer tank 205 may include a level sensor 230. Level sensor 230 may provide a signal indicating a depth of the DEF in buffer tank 205. In some implementations, buffer tank 205 may not include a level sensor 230 (e.g., in the full drain implementation, as described in more detail in connection with FIG. 4). In some implementations, the full drain implementation may include a level sensor 230.

DEF system 200 may pump DEF to buffer tank 205 and/or to nozzle 245. DEF system 200 may include a pump 235 to pump DEF from buffer tank 205 to nozzle 245, a line or manifold purge solenoid 240 that may open when DEF is to be purged from DEF system 200, and/or the like. In some cases, DEF system 200 may include an air manifold. The air manifold may include an air enable solenoid, an air regulator, an air intake, and/or the like. DEF system 200 may mix air from the air manifold with DEF from the buffer tank 205, and may spray the mixture of DEF and air into the exhaust flow using nozzle 245.

As shown, DEF system 200 may include an electronic control module (ECM) 250. ECM 250 may include a controller, a processor, and/or the like. ECM 250 may control one or more functions of DEF system 200. As some examples, ECM 250 may provide a control signal to a solenoid valve (e.g., solenoids 220, 240, and/or the like) to open or close the solenoid valve. In some cases, ECM 250 may control one or more functions of DEF system 200 based on a signal from level sensor 230. For example, when the signal from level sensor 230 indicates that a level of DEF remaining in buffer tank 205 satisfies a threshold, then ECM 250 may cause tank drain solenoid 215 to be closed.

As indicated above, FIG. 2 is provided as an example. Other examples may differ from what was described in connection with FIG. 2.

Figure 3:
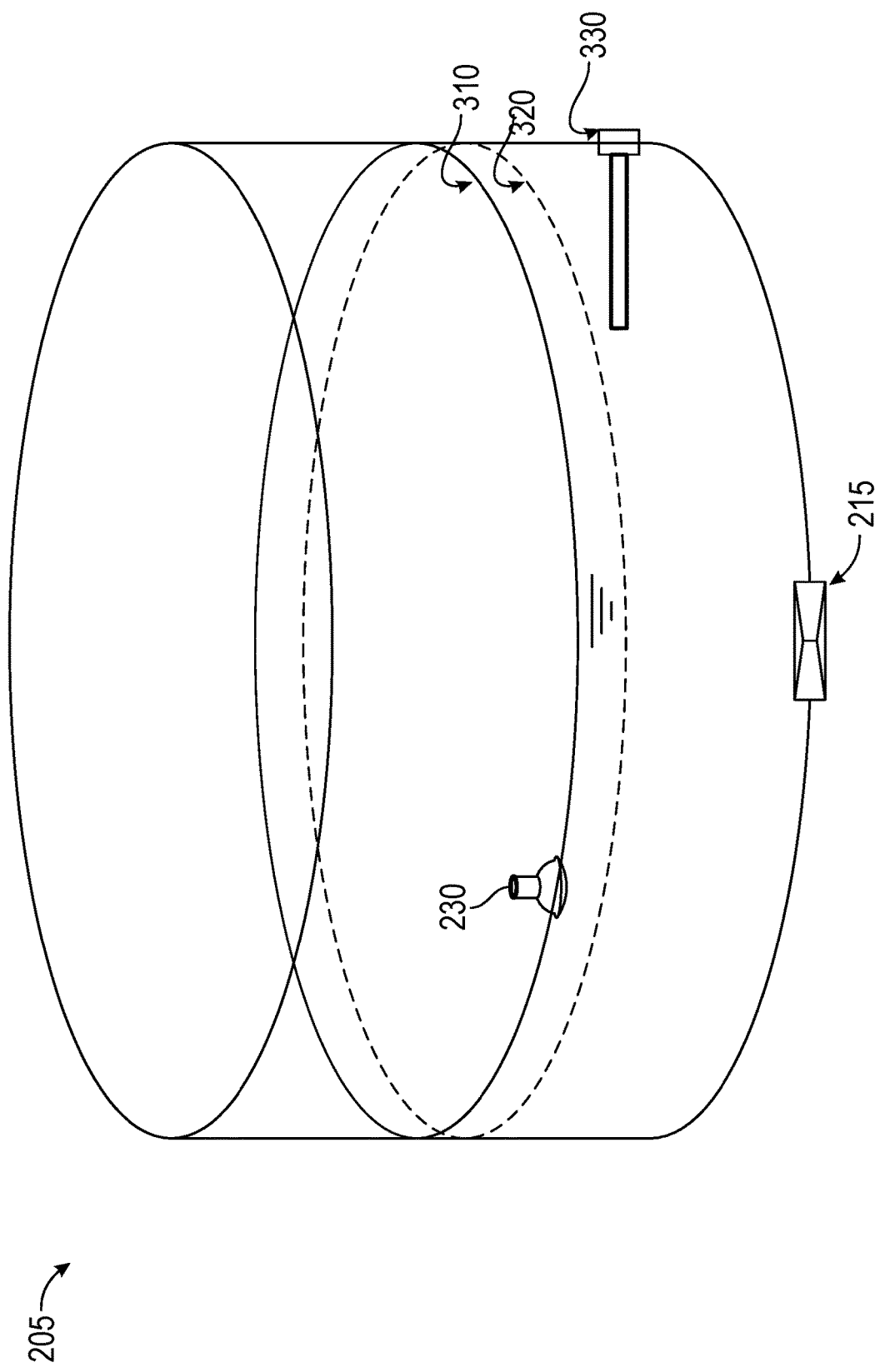
FIG. 3 is diagram of an example buffer tank for a partial drain implementation described herein.

FIG. 3 is diagram of an example buffer tank 205 for a partial drain implementation described herein. This implementation of buffer tank 205 may be used for a partial drain implementation in which DEF is partially drained from buffer tank 205 upon a shutdown condition of DEF system 200 being satisfied, as described in more detail elsewhere herein. As shown, buffer tank 205 may be associated with a tank drain solenoid 215 and a level sensor 230. A level of DEF in buffer tank 205 is shown by the solid line indicated by reference number 310. A threshold level for buffer tank 205 is shown by the dashed line indicated by reference number 320. A heater 330 (e.g., a heating element) of buffer tank 205 is provided below the threshold level for buffer tank 205. In this implementation, tank drain solenoid 215 may be a normally closed solenoid valve.

As indicated above, FIG. 3 is provided as an example. Other examples may differ from what was described in connection with FIG. 3.

Figure 4:
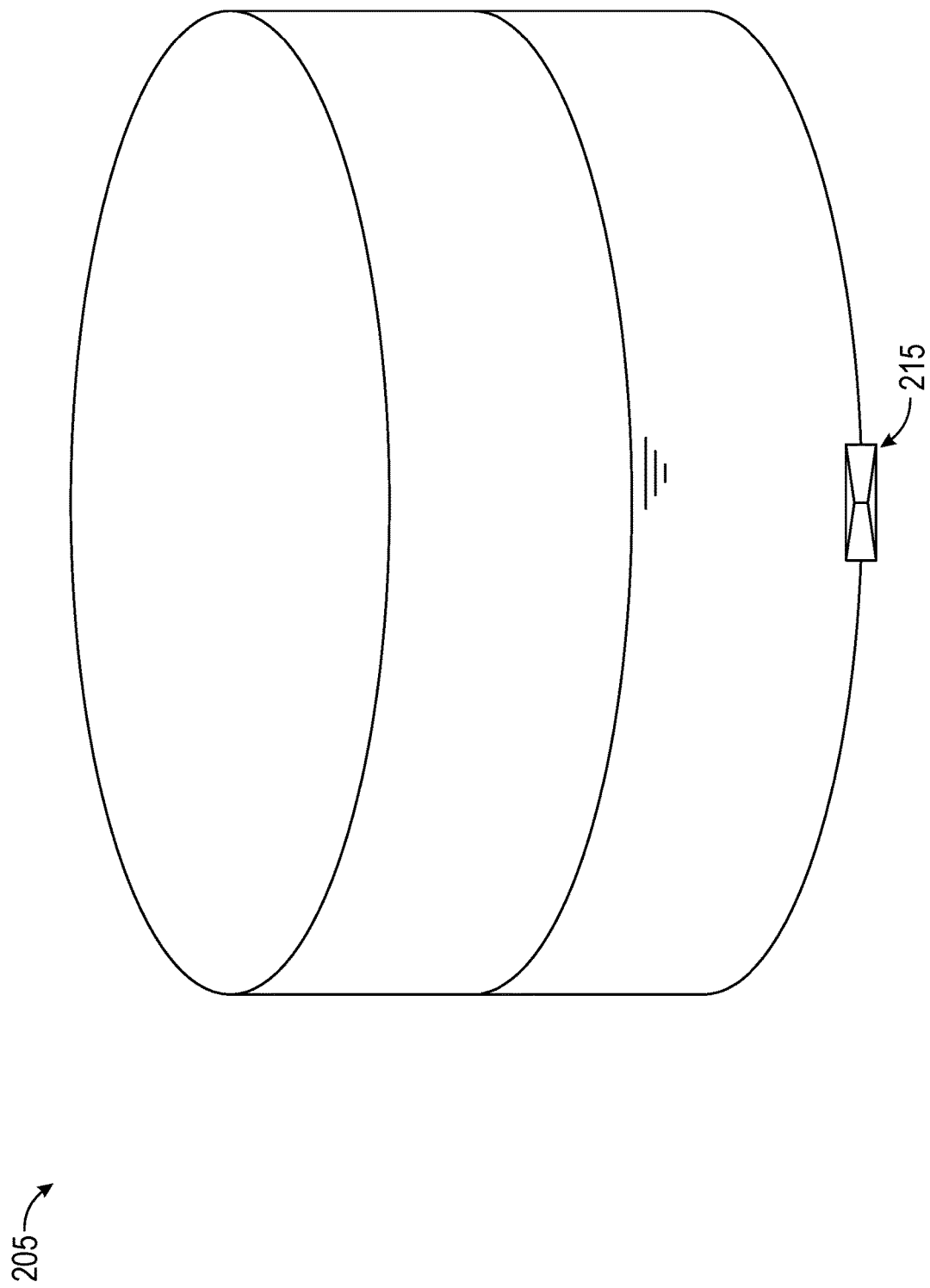
FIG. 4 is diagram of an example buffer tank for a full drain implementation described herein.

FIG. 4 is diagram of an example buffer tank 205 for a full drain implementation described herein. This implementation of buffer tank 205 may be used for a full drain implementation in which DEF is fully drained from buffer tank 205 upon a shutdown condition of DEF system 200 being satisfied or an unpowered state of DEF system 200, as described in more detail elsewhere herein. In this implementation, tank drain solenoid 215 may be a normally open solenoid valve.

As indicated above, FIG. 4 is provided as an example. Other examples may differ from what was described in connection with FIG. 4.

Figure 5:
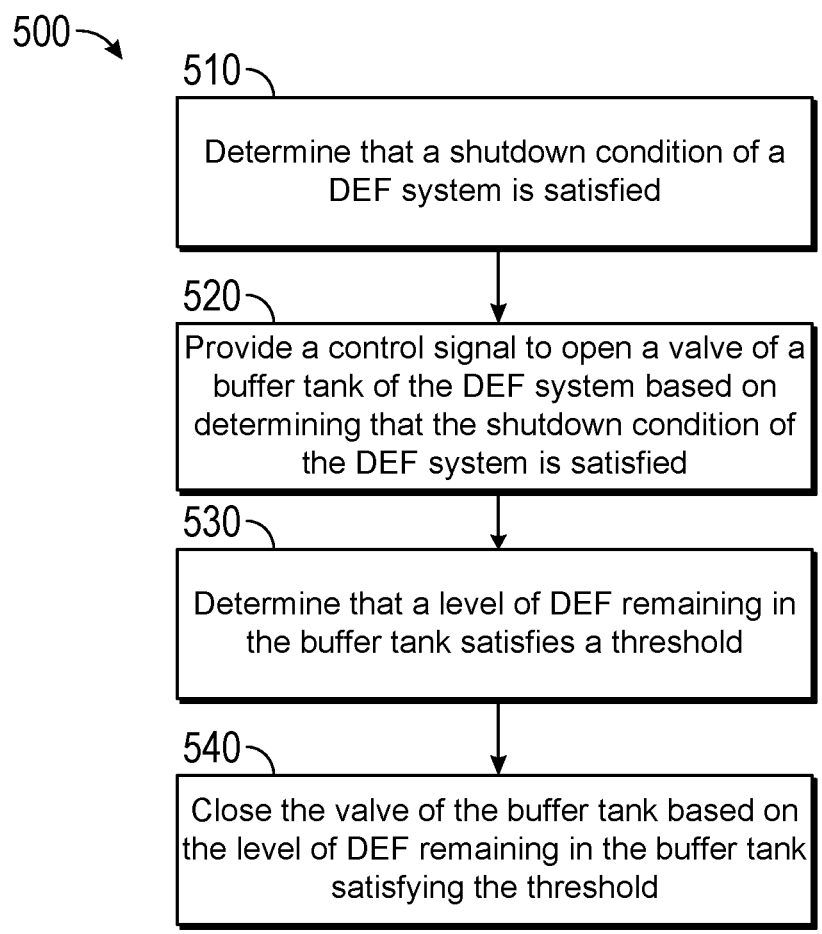
FIG. 5 is a flow chart of an example process for operating a partial drain buffer tank.

FIG. 5 is a flow chart of an example process 500 for operating a partial drain buffer tank. One or more process blocks of FIG. 5 may be performed by an ECM, such as ECM 250. Additionally, or alternatively, one or more process blocks of FIG. 5 may be performed by another device or a group of devices separate from or including the ECM, such as tank drain solenoid 215, level sensor 230, any other device of a DEF system (e.g., DEF system 200), and/or the like.

As shown in FIG. 5, process 500 may include determining that a shutdown condition of a DEF system is satisfied (block 510). For example, the ECM may determine that a shutdown condition of a DEF system (e.g., DEF system 200) is satisfied, as described above. As further shown in FIG. 5, process 500 may include providing a control signal to open a valve of a buffer tank of the DEF system based on determining that the shutdown condition of the DEF system is satisfied (block 520). For example, the ECM may provide a control signal to open a valve (e.g., tank drain solenoid 215) of a buffer tank (e.g., buffer tank 205) of the DEF system based on determining that the shutdown condition of the DEF system is satisfied, as described above.

As further shown in FIG. 5, process 500 may include determining that a level of DEF remaining in the buffer tank satisfies a threshold (block 530). For example, the ECM may determine that a level of DEF remaining in the buffer tank (e.g., as indicated by reference number 310 of FIG. 3) satisfies a threshold (e.g., as indicated by reference number 320 of FIG. 3), as described above. As further shown in FIG. 5, process 500 may include closing the valve of the buffer tank based on the level of DEF remaining in the buffer tank satisfying the threshold (block 540). For example, the ECM may close the valve of the buffer tank based on the level of DEF remaining in the buffer tank satisfying the threshold, as described above.

Process 500 may include additional implementations, such as any single implementation or any combination of implementations described below and/or in connection with one or more other processes described elsewhere herein.

In some implementations, the shutdown condition is satisfied after expiration of a timer and after a shutdown of the DEF system is performed. In some implementations, the level of DEF remaining in the buffer tank is sufficient to submerge a heater of the DEF system in the buffer tank. In some implementations, the buffer tank is drained to a bulk tank of DEF. In some implementations, the ECM may determine that the level of DEF remaining in the buffer tank satisfies the threshold based on a level sensor (e.g., level sensor 230) of the buffer tank. In some implementations, the ECM may receive a signal from the level sensor, wherein the signal indicates the level of DEF remaining in the buffer tank. In some implementations, the valve is a normally closed solenoid valve. In some implementations, closing the valve of the buffer tank may include discontinuing the control signal to cause the valve to close.

Although FIG. 5 shows example blocks of process 500, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The disclosed DEF system (e.g., the DEF system 200) may be used to perform a partial drain or a full drain for any DEF system of a proposed engine where freeze mitigation of DEF is needed.

In some cases, DEF system 200 may drain the DEF to a threshold level (e.g., as indicated by reference number 320 of FIG. 3). In such a case, DEF system 200 may use a normally closed tank drain solenoid 215, as described in more detail in connection with FIG. 3. The level of DEF remaining in the buffer tank 205 may be sufficient to submerge a heater 330 in the DEF. Thus, the time required to thaw the DEF and achieve an operational state may be reduced relative to thawing a full buffer tank of DEF using heater 330. The ECM may determine the level of DEF remaining in the tank based on a signal from level sensor 230. The signal from level sensor 230 may also provide feedback on whether a pump that fills buffer tank 205 (not shown in FIGS. 1-5) and/or supply lines for buffer tank 205 are functioning properly. This may help to prevent a failure case wherein insufficient DEF is provided to buffer tank 205 so DEF must be obtained from bulk tank 210, thereby reducing efficiency of DEF system 200.

In some cases, DEF system 200 may fully drain the DEF when the shutdown condition occurs or when DEF system 200 is unpowered. In such a case, DEF system 200 may use a normally open tank drain solenoid 215, as described in more detail in connection with FIG. 4. When buffer tank 205 is fully drained, no freezing of DEF in buffer tank 205 may occur, thereby reducing or eliminating the need for a heater 330. Furthermore, the full drain implementation may not use a level sensor 230 since the DEF is to be fully drained (although, in some cases, the full drain implementation may include a level sensor 230). Furthermore, the full drain implementation may be robust during a complete power loss, since the normally open tank drain solenoid 215 may open in such a scenario, thereby draining the buffer tank 205.

The shutdown condition may be satisfied when DEF system 200 is to be shut down, when an engine system of machine 102 is to be shut down, and/or the like. In some cases, the shutdown condition may be based on a timer. For example, the timer may be based on a shutdown of the DEF system 200 or an engine system of machine 102. The timer may start when DEF system 200 or an engine system of machine 102 is to be shut down, and the shutdown condition may be satisfied when the timer expires. This may prevent DEF from being prematurely drained from buffer tank 205 and refilled repeatedly during power cycling associated with normal operation of machine 102. For example, the timer may be software-tunable or may be preconfigured.

In this way, time to thaw for buffer tank 205 is reduced, thereby reducing delay associated with warming up machine 102 in cold operating environments. Furthermore, damage to buffer tank 205 and/or fluid paths of DEF system 200 due to fluid expansion may be reduced. Still further, damage and inaccuracy from frozen level sensors that might otherwise cause false readings and/or overflow of buffer tank 205 may be mitigated by reducing time to thaw for buffer tank 205 or eliminating time to thaw by fully draining buffer tank 205.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise forms disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
    determining, by an electronic control module, that a shutdown condition of a diesel exhaust fluid (DEF) system is satisfied;
    providing a control signal from the electronic control module to open a valve of a buffer tank of the DEF system based on determining that the shutdown condition of the DEF system is satisfied;
    draining DEF out of the buffer tank via the valve;
    determining, by the electronic control module, that a level of DEF remaining in the buffer tank satisfies a shutdown threshold level value, the shutdown threshold level value being above a height of a heater within the buffer tank, such that the heater is submerged in the DEF when an amount of DEF in the buffer tank satisfies the shutdown threshold level value; and
    providing a control signal from the electronic control module to close the valve of the buffer tank in response to the shutdown condition being satisfied and based on the level of DEF remaining in the buffer tank satisfying the shutdown threshold level value.

2. The method of claim 1, wherein the shutdown condition is satisfied after expiration of a timer and after a shutdown of the DEF system is performed.

3. The method of claim 1, wherein the buffer tank is drained to a bulk tank of DEF via the valve.

4. The method of claim 1, wherein determining that the level of DEF remaining in the buffer tank satisfies the shutdown threshold level value further comprises:
    determining that the level of DEF remaining in the buffer tank satisfies the shutdown threshold level value based on a signal from a level sensor of the buffer tank, the level sensor being in communication with the electronic control module.

5. The method of claim 4, further comprising:
    receiving in the electronic control module the signal from the level sensor, wherein the signal from the level sensor indicates the level of DEF remaining in the buffer tank.

6. The method of claim 1, wherein the valve is a normally closed solenoid valve.

7. A diesel exhaust fluid (DEF) system, comprising:
    a buffer tank;
    a bulk tank;
    a heater disposed within the buffer tank;
    a solenoid valve in fluid communication with the buffer tank and the bulk tank, to allow DEF to drain from the buffer tank to the bulk tank;
    a level sensor to indicate a level of DEF remaining in the buffer tank; and
    an electronic control module (ECM) in communication with the solenoid valve and the level sensor, the ECM being configured to:
        close the solenoid valve during operation of the DEF system,
        provide a control signal to open the solenoid valve in response to satisfaction of a shutdown condition of the DEF system, and
        close the solenoid valve, after opening the solenoid valve, when the level of DEF remaining in the buffer tank satisfies a shutdown threshold level value, the shutdown threshold level value being above a height of the heater within the buffer tank, such that the heater is submerged in the DEF when an amount of DEF in the buffer tank satisfies the shutdown threshold level value.

8. The DEF system of claim 7, wherein the shutdown condition is based on a timer.

9. The DEF system of claim 8, wherein the timer is based on a shutdown of the DEF system, and wherein the shutdown condition is satisfied when the timer expires.

10. The DEF system of claim 7, wherein the solenoid valve comprises a normally closed solenoid valve.

11. The DEF system of claim 7, wherein the ECM, when closing the solenoid valve when the level of DEF remaining in the buffer tank satisfies the shutdown threshold level value, is further configured to:
    discontinue the control signal to the solenoid valve to cause the solenoid valve to close.

12. The DEF system of claim 7, further comprising:
    a nozzle to mix the DEF with an exhaust flow.

13. The DEF system of claim 12, further comprising:
    a pump between the buffer tank and the nozzle.

14. The DEF system of claim 7, further comprising:
    a pump in fluid communication with the buffer tank and the bulk tank.

15. The DEF system of claim 7, wherein the buffer tank is smaller than the bulk tank.

* * * * *